United States Patent [19]
Kawakami et al.

[11] Patent Number: 6,073,447
[45] Date of Patent: Jun. 13, 2000

[54] TURBOCHARGER

[75] Inventors: Toshiro Kawakami; Jun Kawaguchi, both of Aichi-pref., Japan

[73] Assignee: Aisin Seiki Kabushiki Kaisha, Aichi-Pref., Japan

[21] Appl. No.: 09/404,179

[22] Filed: Sep. 27, 1999

Related U.S. Application Data

[63] Continuation of application No. 08/847,355, Apr. 24, 1997, abandoned.

[30] Foreign Application Priority Data

Apr. 25, 1996 [JP] Japan ................................ 8-105824
Mar. 31, 1997 [JP] Japan ................................ 9-79431

[51] Int. Cl.⁷ .................................................. F02B 37/22
[52] U.S. Cl. ......................................................... 60/602
[58] Field of Search ............................ 60/600, 601, 602, 60/603

[56] References Cited

U.S. PATENT DOCUMENTS

| | | | |
|---|---|---|---|
| 3,423,926 | 1/1969 | Nancarrow et al. | 60/602 |
| 4,389,845 | 6/1983 | Koike | 60/602 |
| 4,565,068 | 1/1986 | Schneider | 60/602 |
| 5,092,126 | 3/1992 | Yano | 60/602 |

FOREIGN PATENT DOCUMENTS

| | | |
|---|---|---|
| 212834 | 3/1987 | European Pat. Off. . |
| 1253510 | 11/1967 | Germany ................ 60/602 |
| 3034271 | 3/1981 | Germany . |
| 3427715 | 12/1985 | Germany . |
| 4202080 | 7/1993 | Germany . |
| 8-7061 | 2/1966 | Japan . |
| 56-113015 | 9/1981 | Japan ................ 60/602 |
| 63-215829 | 9/1988 | Japan ................ 60/602 |
| 4-140425 | 5/1992 | Japan ................ 60/602 |

*Primary Examiner*—Michael Koczo
*Attorney, Agent, or Firm*—Reed Smith Hazel & Thomas LLP

[57] ABSTRACT

A turbocharger incorporating a shaft, a turbine rotor connected to one end of the shaft and a compressor rotor connected to the other end of the shaft is disclosed. A turbine housing in which the turbine rotor rotated by exhaust gas is disposed, is provided with an involute inside wall that forms a scrolling portion for exhaust gas. A compressor housing in which the compressor rotor is disposed is also provided. A division wall divides the scrolling portion into an inside scrolling portion and an outside scrolling portion. A turbocharger has a change means for changing the flow direction of exhaust gas between an inside scrolling portion and an outside scrolling portion.

8 Claims, 5 Drawing Sheets

TURBOCHARGER

This is a continuation of application Ser. No. 08/847,355, filed on Apr. 24, 1997, now abandoned.

FIELD OF THE INVENTION

The present invention relates to a turbocharger, particularly to a turbocharger which can change a rotating speed of a turbine rotor.

BACKGROUND OF THE INVENTION

A conventional turbocharger is disclosed in, for example, Japanese examined Utility-Model publication No. 8(1996)-7061. This turbocharger includes a turbine rotor, a turbine-housing, a plurality of nozzle vanes and a link mechanism. The turbine rotor is connected to a shaft and has a plurality of turbine wings. The turbine rotor is rotated by exhaust gas and disposed in the turbine housing. The turbine housing is provided with an involute inside wall which forms a scrolling portion for exhaust gas. The nozzle vanes are placed in the scrolling portion and supported by the turbine housing. The link mechanism controls the angle of the nozzle vanes so as to change the flowing direction of exhaust gas to the turbine rotor. Therefore, the rotation speed of the turbine rotor can be changed. The rotation speed of the turbine rotor is low when the angle of the nozzle vanes is large so that the flow of exhaust gas is directed toward the center of the shaft. The rotation speed of the turbine rotor is high when the angle of the nozzle vanes is small so that the flow of exhaust gas is toward the tangent line of the turbine rotor.

In the above-mentioned turbocharger, the link mechanism changes the angles of the nozzle vanes simultaneously. However, the temperature in the scrolling portion is more than 1,000° Centigrade. Therefore, the link mechanism must be made of a heat-resistant material. Further, the exhaust gases include a considerable amount of carbon compound. The carbon compound influences the operation of the link mechanism. Therefore, the link mechanism needs to be highly reliable.

SUMMARY OF THE INVENTION

It is, therefore, an object of the present invention to provide an improved turbocharger which overcomes the foregoing drawbacks.

In accordance with the present invention, a turbocharger has a shaft, a turbine rotor connected to one end of the shaft and a compressor rotor connected to the other end of the shaft. A turbine housing in which the turbine rotor rotated by exhaust gas is disposed, is provided with an involute inside-wall which forms a scrolling portion for exhaust gas. A compressor housing in which the compressor rotor is disposed is also provided. A division wall divides the scrolling portion into an inside scrolling portion and an outside scrolling portion. A turbocharger has a change means for changing the flow direction of the exhaust gas between an inside scrolling portion and an outside scrolling portion.

BRIEF DESCRIPTION OF THE DRAWING FIGURES

Additional objects and advantages of the present invention will become more apparent from the following detailed description of the preferred embodiments thereof when considered with reference to the attached drawings, in which.

DETAILED DESCRIPTION OF THE PREFERRED EMBODIMENTS

A turbocharger in accordance with the preferred embodiments of the present invention will be described with reference to the attached drawings.

Figure 1:
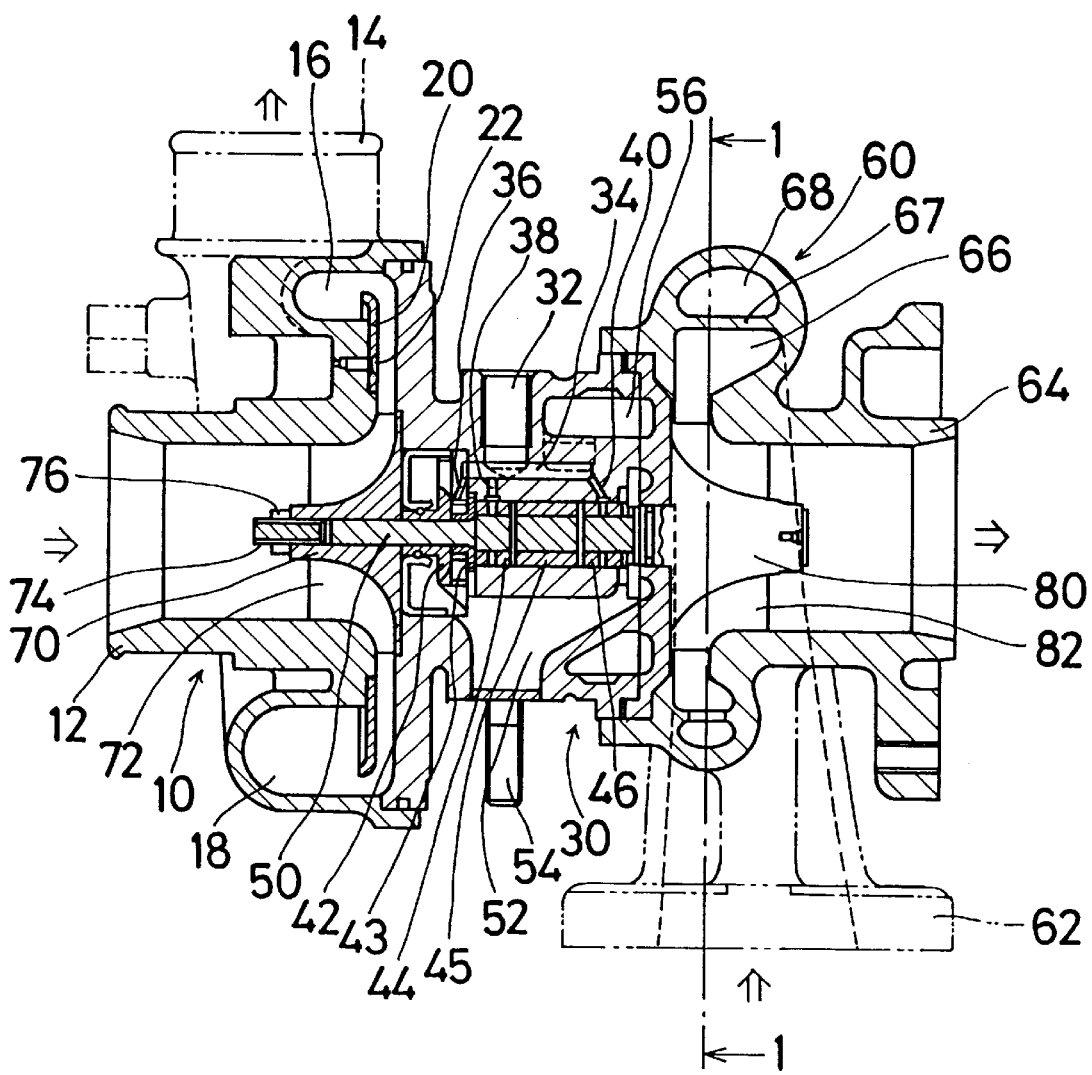
FIG. 1 is a sectional view of the first embodiment of a turbocharger in accordance with the prevent invention.
Figure 2:
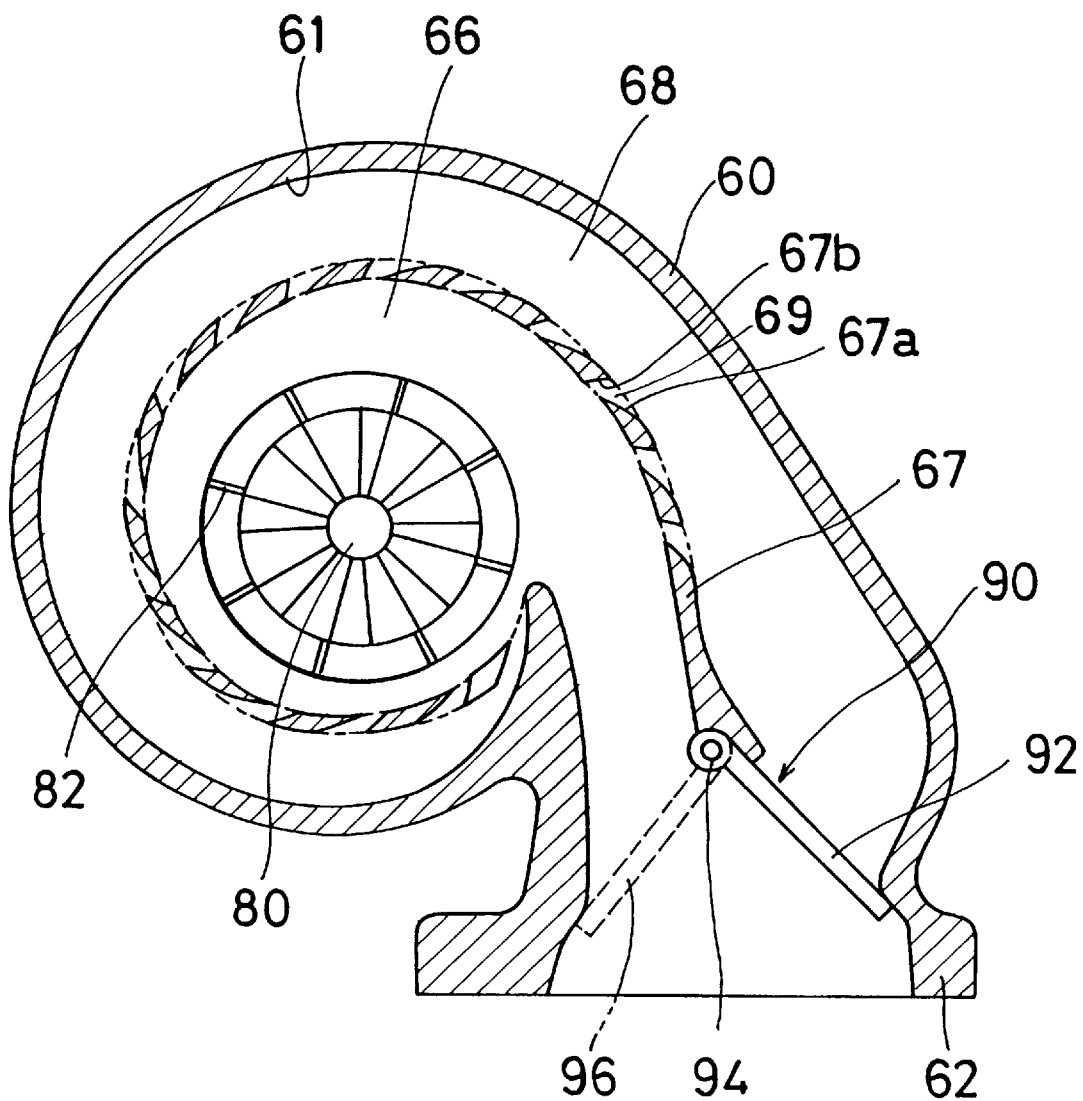
FIG. 2 is a sectional view taken along the line 1—1 in FIG.1 in accordance with the present invention.

FIGS. 1 and 2 show the first embodiment of the present invention. Referring to FIG. 1, a compressor housing 10 made of cast iron is provided with a compressor intake port 12 and a compressor discharge port 14. A diffuser 20 is connected with the compressor housing 10 by a bolt 22 to form a ring shaped scroll 16. The ring shaped scroll 16 interconnects with the compressor intake port 12 and the compressor discharge port 14. The small cross section area of the ring shaped scroll 16 is placed near the compressor intake port 12. The cross section area of the ring shaped scroll 16 becomes larger as the scroll 16 approaches the compressor discharge port 14 so that the large cross section area of the ring shaped scroll 18 is placed near the compressor discharge port 14.

A bearing housing 30 is connected with the compressor housing 10 and has an oil intake port 32. The oil intake port 32 is communicated with three oil passages 36, 38 and 40 through an oil passage 34. Therefore, the oil is supplied to the intake port 32 from an oil pump (not shown) and further supplied to a shaft 50 and five bearings 42, 43, 44, 45 and 46 through the oil passages 34, 36, 38 and 40. The bearings 42, 43, 44, 45 and 46 are supported by the shaft 50. On the other hand, the bearing housing 30 has an oil discharge port 54, which is communicated with the bearings 42, 43, 44, 45 and 46 through a room 52. A passage for cooling water is provided.

A turbine housing 60 connected with the bearing housing 30, includes an input port 62 and an output port 64 for exhaust gas. As shown in FIG. 2, an involute inside wall 61 is provided with the turbine housing 60. The involute inside wall 61 forms a scrolling space which is defined by two scrolling portions 66 and 68 and an involute division wall 67. The involute division wall 67 includes a first surface 67a and a second surface 67b and connects the scrolling portion 66 with the scrolling portion 68. The first surface 67a and second surface 67b are formed at angles toward the rotating direction of the turbine rotor 80 relative to a first reference line extending from the center of rotation of the turbine rotor 80 that is perpendicular to a second reference line tangent to the outer diameter of the turbine rotor 80 so as to form a converging nozzle. The first surface 67a is placed at a small angle to the rotating direction of a turbine rotor 80. The second surface 67b is placed at a large angle to the rotating direction of the turbine rotor 80. A connecting portion 69 is formed between the first surface 67a and the second surface 67b.

A change valve 90 is placed near the input port 62. The change valve 90 includes a valve 92 and a shaft 94. The shaft 94 is connected to the valve 92 and is supported by the involute division wall 67 so that the valve 92 can rotate from the position of the valve 92 to the position indicated by the broken line 96 in FIG. 2. The valve 92 closes one of the scrolling portion 66 or the scrolling portion 68.

As shown in FIG. 1, each end of the shaft 50 has a bolt 74. One end of the shaft 50 at the side of the compressor housing 10 is connected to a compressor rotor 70 by a nut 74. The other end of the shaft 50 is connected to the turbine rotor 80. When the turbine rotor 80 rotates, the compressor rotor 70 rotates together. The compressor rotor 70 has a plurality of compressor fins 72, and the turbine rotor 80 has a plurality of turbine fins 82. Both fins 72 and 80 are extended in the radius direction of the shaft 50.

In accordance with the above mentioned turbocharger, exhaust gas comes into the turbine housing 60 through the input port 62 and makes the turbine rotor 80 rotate. Exhaust gas discharges form the turbine housing 60 through the output port 64. The turbine rotor 80 rotates the compressor rotor 70. The compressor rotor 70 with the compressor fins 72 compresses intake gas (air) through the compressor intake port 12, and discharges intake gas to an combustion engine (not shown) through the compressor discharge port 14.

When the combustion engine is driven at a low speed, the amount of exhaust gas is small. The valve 90 of the change valve 90 closes the scrolling portion 68 as shown in FIG. 2 so as to direct exhaust gas into the scrolling portion 66. Exhaust gas flows along the tangent line of the turbine rotor 80. Therefore, exhaust gas collides with the turbine fins 82 at the right angle so that the flow of exhaust gas increases the rotational efficiency of the turbine rotor 80.

When the combustion engine is driven at a high speed, the valve 92 of the change valve 90 closes the scrolling portion 66 so as to rotate the turbine rotor 80 slowly. When exhaust gas flows into the scrolling portion 68, exhaust gas does not rotate the turbine rotor 80. When exhaust gas flows from the scrolling portion 68 into the scrolling portion 66 through the connecting portions 69, exhaust gas collides with the second surface 67b by the first surface 67a and flows into the turbine rotor 80 along the second surface 67b. Therefore, the flow of exhaust gas does not increase the rotational efficiency of the turbine rotor 80, because the flow speed is low and the flow direction of the exhaust gas is nearly equal to the direction of the turbine fins 82 of the turbine rotor 80.

When the combustion engine is driven at a middle speed, the valve 92 of the change valve 90 opens both the scrolling portions 66 and 68. For example, the position of the valve 92 of the change valve 90 is in the middle position which is between the position indicated by the line 92 and the position indicated by the broken line 96 in FIG. 2. Therefore, the turbine rotor rotates at a predetermined speed.

Figure 3:
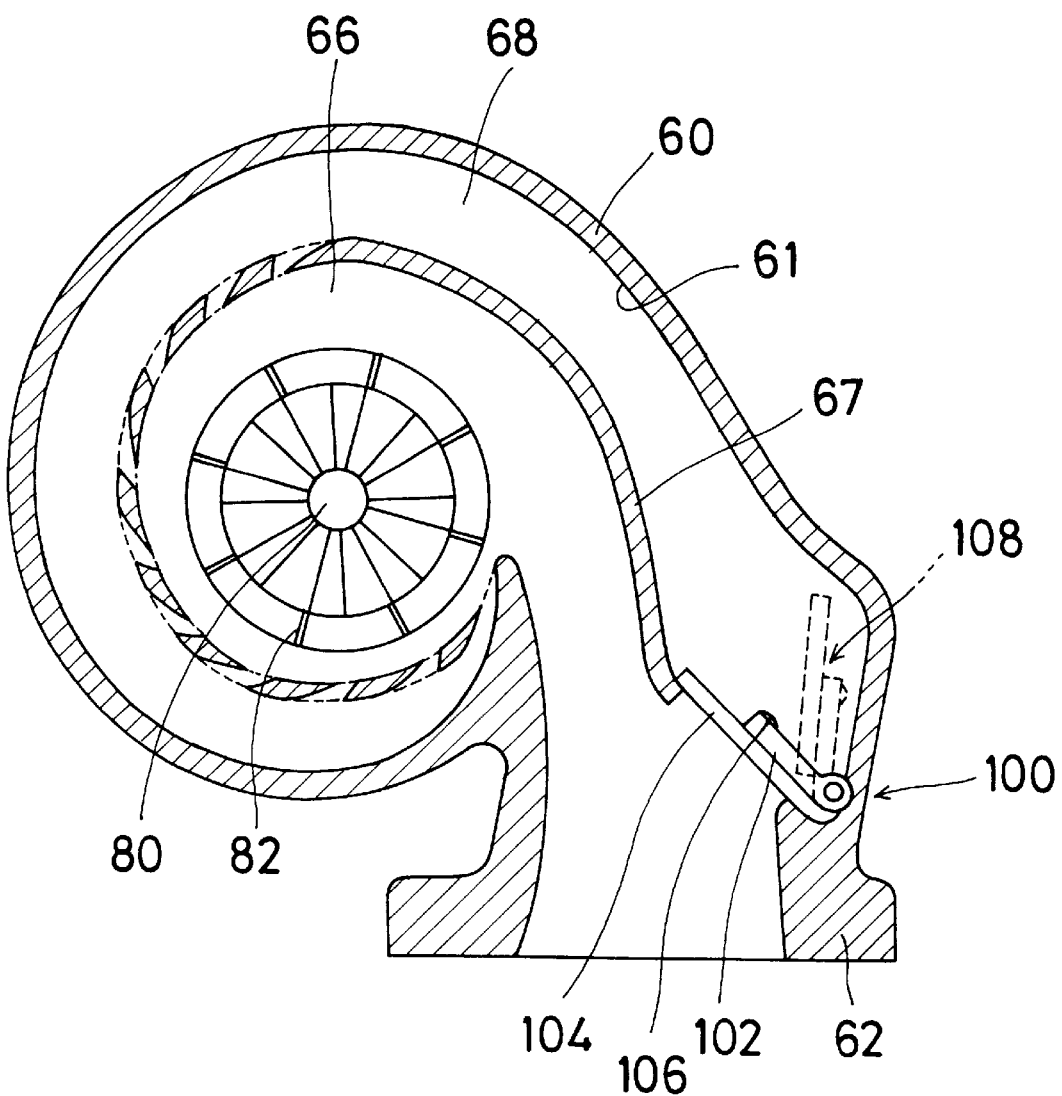
FIG. 3 is a sectional view of the second embodiment of a turbocharger in accordance with the prevent invention.

FIG. 3 illustrates the second embodiment of the present invention which is a modified version of the first preferred embodiment, specifically a modified arrangement of a change valve 100. In FIG. 3, the same parts indicated by the same numerals as used in FIG. 2. In the second embodiment, the change valve 100 is arranged on the outer side of the turbine housing 60. The change valve 100 includes a hinge portion 102 and a valve portion 104. A bolt 106 connects the hinge portion 102 with the valve portion 104. The connecting portions 69 formed in the involute division wall 67, are placed only at the downstream side of the involute division wall 67.

In operation, when the combustion engine is driven at a low speed, the change valve 100 closes the scrolling portion 68 so as to direct exhaust gas into the scrolling portion 66. When the combustion engine is driven at a high speed, the change valve 100 opens the scrolling portion 68 so as to direct exhaust gas into the scrolling portions 66 and 68. The flow of exhaust gas from the scrolling portion 68 into the scrolling portion 66 through the connecting portions 69 changes the direction.

Figure 4:
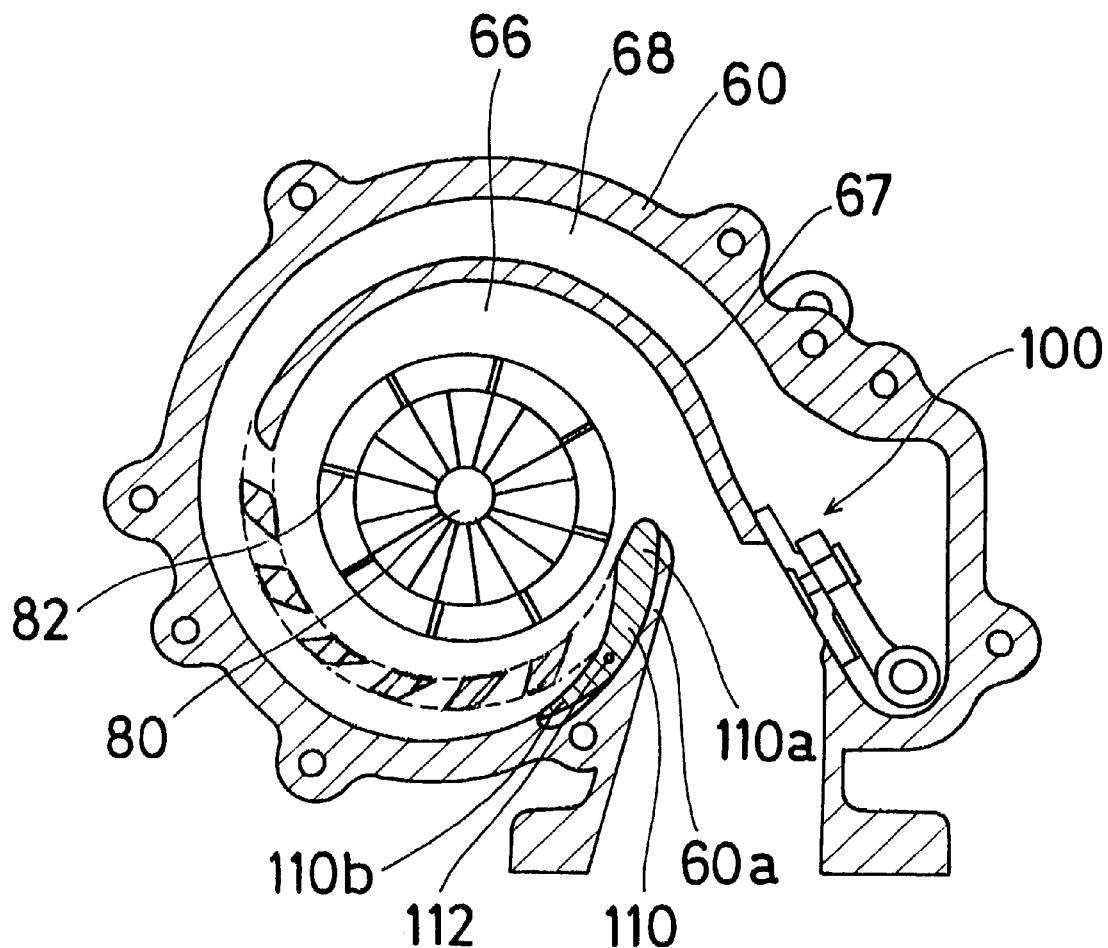
FIGS. 4 and 5 are sectional views of the third embodiment of a turbocharger in accordance with the prevent invention.
Figure 5:
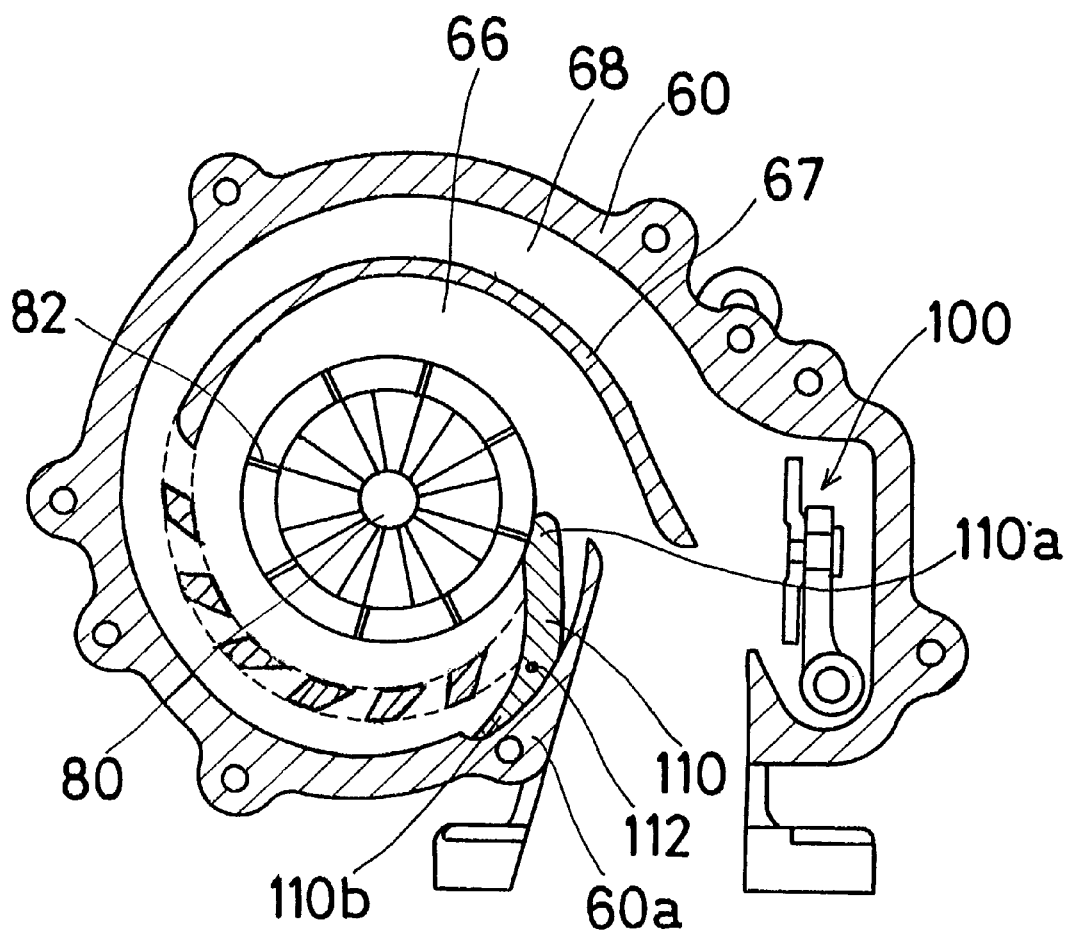

FIGS. 4 and 5 illustrate the third embodiment of the present invention which is an another modified version of the first preferred embodiment, specifically a modified arrangement of a valve 110. In FIGS. 4 and 5, the same parts are indicated by the same numerals as used in FIG. 2 or FIG. 3. In the third embodiment, the valve 110 is arranged at the end of the scrolling portion 68. The valve 110 is crescent-shaped and includes a thick end portion 110a and a thin end portion 100b. A shaft 112 is arranged in parallel with the shaft 50 (shown in FIG. 1) and supports the valve 110. The valve 110 is rotated by exhaust gas in a predetermined range. The thick end portion 110a is connected with a brim portion 60a of the turbine housing 60 at one end of the predetermined range, as shown in FIG. 4. The thin end portion 110b is connected with the brim portion 60a of the turbine housing 60 at the other end of the predetermined range, as shown in FIG. 5.

In operation, when the combustion engine is driven at a low speed, the change valve 100 closes the scrolling portion 68 so as to direct exhaust gas into the scrolling portion 66. The position of the valve 110 is placed as shown in FIG. 4. The flow of exhaust gas in the scrolling portion 66 increases the rotational efficiency of the turbine rotor 80. When the combustion engine is driven at a high speed, the change valve 100 opens the scrolling portion 68 so as to direct exhaust gas into the scrolling portions 66 and 68. The position of the valve 110 is placed as shown in FIG. 5. The flow of exhaust gas in the scrolling portions 66 and 68 does not increase the rotational efficiency of the turbine rotor 80. When the change valve 100 closes the outside scrolling portion 68 as shown in FIG. 4, the exhaust gas can flow only inside the scrolling portion 66. The exhaust gas flown into the inside scrolling portion 66 hits the thick end portion 110a. Therefore, the valve 110 is rotated in the clock-wise direction such that the thick end portion 110a is connected with the brim portion 60a of the turbine housing 60. On the other hand, when the change valve 100 opens the outside scrolling portion 68 as shown in FIG. 5, the exhaust gas can flow to both the inside scrolling portion 66 and the outside scrolling portion 68. The exhaust gas flown into the outside scrolling portion 68 hits the thin end portion 110b. Therefore, the valve 110 is rotated in the counter-clockwise direction such that the thick end portion 110b is contacted with the brim portion 60a of the turbine housing.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A turbocharger comprising:
   a shaft;
   a turbine rotor connected to one end of said shaft;
   a compressor rotor connected to the other end of the shaft;
   a turbine housing in which said turbine rotor rotated by exhaust gas is disposed and which is provided with an exhaust gas inlet port, an exhaust gas outlet port, and a scrolling portion communicating between said exhaust gas inlet port and said exhaust gas outlet port through said turbine rotor;

a compressor housing in which said compressor rotor is disposed;

a division wall having a plurality of connecting portions that peripherally and successively surround the turbine rotor, and which divides said scrolling portion into an inside scrolling portion and an outside scrolling portion in the radial direction of said shaft, said inside and outside scrolling portions each being in direct communication with said exhaust gas inlet port, a plurality of communicating slits which are provided in said division wall via said connecting portions and which communicate between said inside scrolling portion and said outside scrolling portion, and a control means for controlling the communication at least between said exhaust gas inlet port and the outside scrolling portion.

2. The turbocharger of claim 1, wherein the control means includes a valve which closes one of the outside scrolling portion or the inside scrolling portion.

3. The turbocharger of claim 2, wherein a vane is located at the end of the outside scrolling portion, and is supported by a vane shaft which is parallel with the shaft and rotated for a predetermined angle by exhaust gas.

4. The turbocharger of claim 1, wherein at least one of the communicating slits has a first surface and a second surface which is located more downstream than the first surface, and whose angle to the tangential direction of said turbine rotor is larger than the same of the first surface so as to form a converging nozzle.

5. The turbocharger of claim 4, wherein the communicating slits are located at a downstream area of the scrolling portion.

6. The turbocharger of claim 2, wherein said turbocharger further comprises a flow control mechanism for changing the flow direction of the exhaust gas, which is located at the maximum downstream point of the scrolling portion.

7. The turbocharger of claim 6, wherein the flow control mechanism includes a vane which is rotated by the exhaust gas.

8. The turbocharger of claim 1, wherein the turbine housing further includes a volute inside wall for forming the scrolling portion, and wherein the division wall is located along the volute inside wall.

* * * * *